Feb. 19, 1952   H. H. BIXLER   2,586,506
REFRIGERATOR CONTROL
Filed Jan. 7, 1950
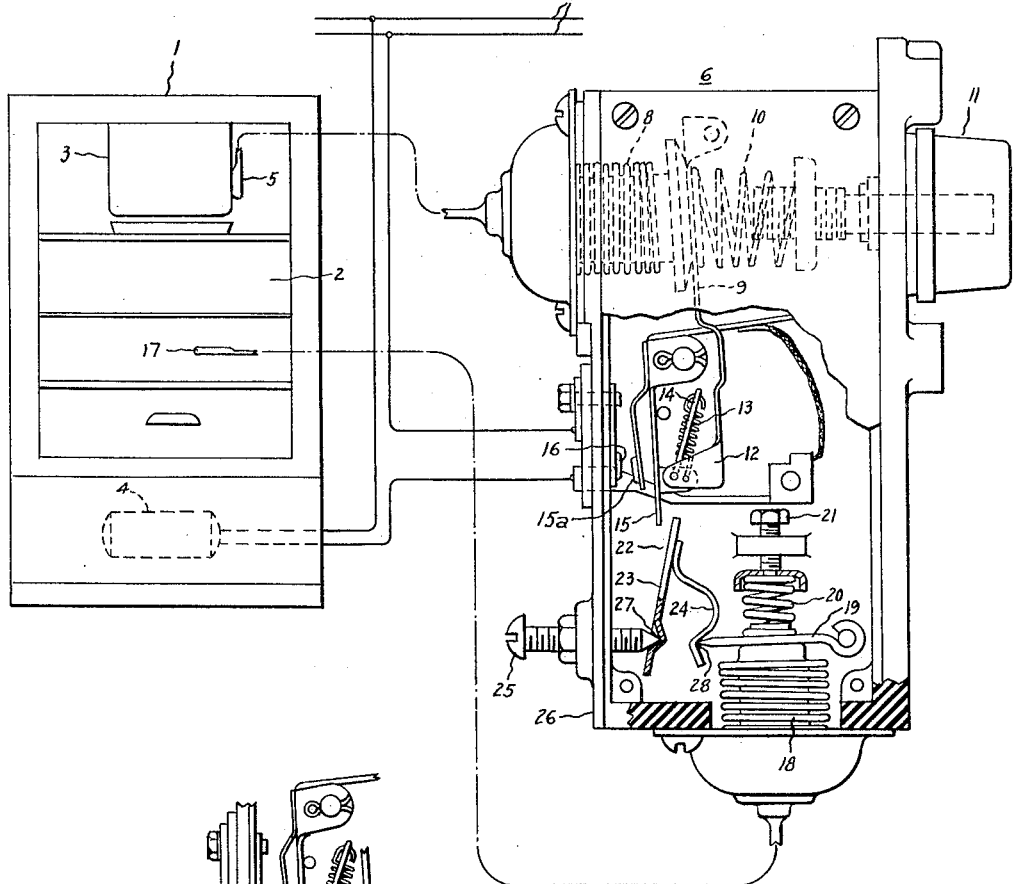
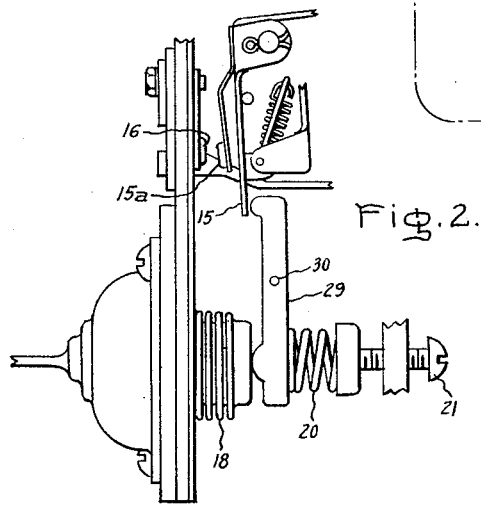
Inventor:
Harley H. Bixler,
by William G. Edwards, Jr.
His Attorney.

Patented Feb. 19, 1952

2,586,506

UNITED STATES PATENT OFFICE 2,586,506

REFRIGERATOR CONTROL

Harley H. Bixler, Erie, Pa., assignor to General Electric Company, a corporation of New York Application January 7, 1950, Serial No. 137,405

2 Claims. (Cl. 62—4)

This invention relates to refrigerating apparatus and, more particularly, to an improved control therefor.

Mechanical refrigerating systems include a compressor, a condenser, and an evaporator, the latter being placed within the food storage compartment of a refrigerator. A control, responsive to the temperature of the evaporator, regulates the operation of the compressor. Specifically, when the evaporator reaches a predetermined maximum temperature, the control starts the compressor to supply liquid refrigerant to the evaporator. When the evaporator reaches predetermined minimum temperature, the control stops the compressor. In this manner, the temperature of the evaporator is maintained substantially within a predetermined temperature range.

It is possible, however, for the temperature of the food storage compartment to be above its desired maximum value although the evaporator itself is within the range of temperature that does not require the operation of the compressor. For instance, the evaporator might be coated with a coating of frost which insulates it from the food storage compartment and, while the food storage compartment may be above a safe operating level, this condition is not noted by the temperature-responsive unit which is influenced primarily by the temperature of the evaporator. In addition, the coating of frost on the evaporator insulates the evaporator to the extent that it does not withdraw enough heat from the food storage compartment to raise its temperature to the point where operation of the compressor is called for. By my invention a second temperature-responsive element is placed within the food storage compartment itself. This second temperature-responsive element, being responsive to the temperature of the food storage compartment, can call for operation of the compressor whether or not the evaporator is above that predetermined temperature at which the temperature-responsive element associated with it calls for operation of the compressor. This second temperature-responsive element assumes control over the compressor until the food storage compartment is again at a safe operating temperature.

It is a further object of this invention to provide an improved control system for refrigerating apparatus including one temperature-responsive element which is influenced primarily by the temperature of the evaporator and a second temperature-responsive element which is influenced primarily by the temperature of the food storage compartment.

It is a still further object of this invention to provide for a refrigerator compressor unit an improved secondary control which is responsive to the temperature within the food storage space of a refrigerator and which shall be of simple and inexpensive construction.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

In carrying out the objects of this invention I provide a structure wherein a secondary temperature responsive element controls the energization of an electrical circuit that operates a compressor unit. The secondary temperature responsive element functions independently of the main control, so long as the main control is in the circuit open position.

In the drawing, Fig. 1 is a side view of the improved control apparatus diagrammatically connected to a refrigerator; while Fig. 2 is a side view of a modification of a portion of the control system shown in Fig. 1.

Referring to the drawing, a refrigerator 1 is shown having a food storage space 2, an evaporator 3, and a motor driven compressor 4. A temperature responsive bulb or element 5, mounted on evaporator 3, actuates a control system 6 which regulates current passing from a power supply 7 to compressor 4. Compressor 4 supplies refrigerant to evaporator 3 to cool food storage space 2.

In control 6, a main bellows 8 is responsive to the temperature of evaporator 3, indicated by bulb 5. Main bellows 8 expands when the temperature at evaporator 3 increases and thus moves an operating arm 9 in opposition to the bias of a spring 10. A control knob 11 regulates the bias of spring 10. Lower end 12 of operating arm 9 actuates an over-center device which comprises a spring 13 and a U-shaped connecting arm 14. When bellows 8 has expanded a predetermined distance, relative to a predetermined setting of spring 10, the over-center device is actuated by end 12 of arm 9 to cause a contact 15a on a switch or contact arm 15 to close against a fixed contact 16. This closes the circuit from power supply 7 and energizes compressor 4. Upon the cooling of evaporator 3, bellows 8 contracts and end 12 of operating arm 9 trips the over-center device to move contact arm 15 away from fixed contact 16. A more complete description of this operation may be had by reference to U. S. Patents 1,921,126 and 2,050,883, which are assigned to the same assignee as the assignee of the present invention.

Occasionally, evaporator 3 is coated with such a heavy frost that the temperature of the evaporator is below its predetermined maximum while the temperature of the food storage space 2 is above a safe level. To compensate for this condition, a second temperature-responsive element 17 is shown positioned in food storage space 2 and connected to a secondary bellows 18 to control the energization of compressor 4, while main bellows 8 calls for a circuit open position.

An actuating or operating arm 19 is provided between bellows 18 and a spring 20, the bias of which is controlled by a set screw 21. Arm 19 acts on an inverted Y-shaped lever 22 having legs 23 and 24. Lever 22 is positioned to actuate arm 15 of the main control. A set screw 25 is positioned in the wall 26 of the control housing for adjusting the differential or range of temperature within which the secondary bellows 18 operates. Set screw 25 and actuating arm 19 are each provided with a knife edge or pointed end engageable respectively with an indentation 27 in leg 23 and an indentation 28 in leg 24.

Assuming that bellows 8 calls for a circuit open position at a time when the temperature of the air in the food storage compartment is above a predetermined maximum, then, with this structure as above described, the expansion of a bellows 18 moves actuating arm 19 to revolve lever 22 about the point of set screw 25. The inverted Y-shaped lever 22 acts on arm 15 to close contact 15a against fixed contact 16 and energize compressor 4.

In the operation of this device, any increase in the temperature of the food storage compartment 2 is reflected in temperature-responsive element 17, which affects the expansion and contraction of auxiliary bellows 18. As the temperature within the food storage compartment rises, bellows 18 expands and actuates arm 19. At a predetermined maximum temperature, the expansion of bellows 18 causes arm 19 to move upward to the extent that lever 22 is rotated about set screw 25 to press contact arm 15 and close contact 15a on fixed contact 16, thereby energizing compressor 4. This condition exists until the temperature within food storage compartment 2 is again reduced to a predetermined minimum, whereupon bellows 18 contracts sufficiently that lever 22 is rotated in the opposite direction about set screw 25 to release contact arm 15 and to open contact 15a away from fixed contact 16.

A modification of this invention is shown in Fig. 2, wherein auxiliary bellows 18 is again biased by a spring 20 and a set screw 21. In this modification, however, the bellows operates on contact arm 15 by means of a pivot arm 29 which is pivotable about a pin 30.

Arm 29 is positioned between bellows 18 and spring 20. The operation of this device is similar to that shown in Fig. 1, except that arm 29 is rotated about pin 30 by the expansion of bellows 18 to energize the circuit compressor 4.

With the structure of the elements of this invention as disclosed, secondary bellows 18 does not have to actuate the main operating arm 9, but instead actuates contact arm 15 which is biased by a light spring 13 requiring much less effort to move than the main contact arm 9. Consequently, auxiliary bellows 18 may be made much smaller than the main operating bellows; were the secondary bellows 18 to actuate the main arm 9, a bellows of approximately the size and cost of the main bellows 8 would be required since it would operate against the bias of the strong spring 10 rather than the relatively weak spring 13.

Modifications of this invention will occur to those skilled in the art and it is desired to be understood, therefore, that this invention is not limited to the particular arrangement disclosed, but that the appended claims are intended to cover all modifications which are within the spirit and scope of this invention.

What I claim as new and desire to secure by Letters Patent of the United States is:

1. In a refrigerator having a compressor, an electrical circuit having an overcenter operated switch therein for operating said compressor, a food storage compartment and an evaporator positioned in the food storage compartment, a first temperature-responsive element positioned to be influenced primarily by the temperature of said evaporator, and a second temperature-responsive element positioned to be influenced primarily by the temperature of said food storage compartment, a first control system responsive to said first temperature-responsive element, said first control system comprising a first expansible bellows, a first spring positioned to bias said first bellows, a first operating arm positioned between said first bellows and said first spring, and a switch arm operable in response to movement of said operating arm to open and close said circuit for operating said compressor, a second control system comprising a second expansible bellows, a second spring biasing said bellows, a second operating arm positioned between said second bellows and said second spring, and means responsive to the movement of said second operating arm for independently opening and closing said switching arm to energize said compressor circuit in response to the movement of said second operating arm while said first operating arm is in the circuit open position.

2. In a refrigerator having a compressor, an electrical circuit for operating said compressor, a food storage compartment and an evaporator positioned in the food storage compartment, a first temperature-responsive element positioned to be influenced primarily by the temperature of said evaporator, and a second temperature-responsive element positioned to be influenced primarily by the temperature of said food storage compartment, an overcenter operated switch in the circuit for said control compressor, a first means including a first operating arm responsive to said first temperature-responsive element for opening and closing said switch to operate said compressor, and a second control means including a second operating arm responsive to said second temperature-responsive element for opening and closing said switch independently of said first operating arm while said first control means and said first control arm are in a switch open position whereby said compressor is operated by said second control means when said first control means is in the circuit open position.

HARLEY H. BIXLER.

REFERENCES CITED

The following references are of record in the file of this patent:

UNITED STATES PATENTS

| Number | Name | Date |
|---|---|---|
| 2,080,169 | Dillman | May 11, 1937 |
| 2,094,719 | Philipp | Oct. 5, 1937 |
| 2,101,498 | Grooms | Dec. 7, 1937 |
| 2,345,505 | Siedle | Mar. 28, 1944 |